United States Patent

Sawant et al.

(12) United States Patent
(10) Patent No.: US 7,097,883 B2
(45) Date of Patent: Aug. 29, 2006

US007097883B2

(54) LOW TEMPERATURE LIQUID POLYTHIOETHER POLYMERS

(75) Inventors: Suresh Sawant, Stevenson Ranch, CA (US); Chandra Bhushan Rao, Valencia, CA (US); David Rosendo Leon, Pasadena, CA (US)

(73) Assignee: PPG Industries Ohio, Inc., Cleveland, OH (US)

( * ) Notice: Subject to any disclaimer, the term of this patent is extended or adjusted under 35 U.S.C. 154(b) by 186 days.

(21) Appl. No.: 10/456,138

(22) Filed: Jun. 5, 2003

(65) Prior Publication Data

US 2004/0247792 A1 Dec. 9, 2004

(51) Int. Cl.
*C08G 75/04* (2006.01)

(52) U.S. Cl. .................... 427/385.5; 526/273; 526/332; 528/403; 528/406

(58) Field of Classification Search ................ 528/373, 528/375, 376, 403, 405; 427/385.5
See application file for complete search history.

(56) References Cited

U.S. PATENT DOCUMENTS 4,104,283 A * 8/1978 Hickner ................ 549/556

| 4,366,307 | A | 12/1982 | Singh et al. |
| 5,225,472 | A | 7/1993 | Cameron et al. |
| 5,912,319 | A | 6/1999 | Zook et al. |
| 5,959,071 | A | 9/1999 | DeMoss et al. |
| 6,172,179 | B1 | 1/2001 | Zook et al. |
| 6,232,401 | B1 | 5/2001 | Zook et al. |
| 6,486,297 | B1 | 11/2002 | Zook et al. |
| 6,509,418 | B1 | 1/2003 | Zook et al. |
| 6,525,168 | B1 | 2/2003 | Zook et al. |

FOREIGN PATENT DOCUMENTS

| EP | 0609061 A | 8/1994 |
| WO | WO 01/66621 A1 | 9/2001 |
| WO | WO 01/66622 A1 | 9/2001 |

OTHER PUBLICATIONS

PCT International Search Report for International Application No. PCT/US2004/015581, mailed Oct. 12, 2004, 8 pages.

* cited by examiner

*Primary Examiner*—Margaret G. Moore
*Assistant Examiner*—Mark Zimmer
(74) *Attorney, Agent, or Firm*—Diane R. Meyers

(57) ABSTRACT

Polythioether polymers, curable compositions of polythioether polymers, the process of making polythioether polymers, and the use of polythioether polymers in sealants, wherein the polythioether polymers and curable compositions are liquid at a temperature of 20° C. or less, are disclosed.

81 Claims, No Drawings

LOW TEMPERATURE LIQUID POLYTHIOETHER POLYMERS

FIELD OF THE INVENTION

This invention is directed to polythioether polymers, curable compositions of polythioether polymers, processes for producing polythioether polymers, and the use of polythioether polymers in sealants, wherein the polythioether polymers and curable compositions are liquid at a temperature of 20° C. or less.

BACKGROUND OF INVENTION

Polythioether polymers are widely used in aviation and aerospace sealants primarily due to their excellent fuel-resistance. In addition to resistance to aviation fuels, polymers useful in aviation and aerospace sealants desirably exhibit the properties of low temperature flexibility, room temperature liquidity, and high temperature resistance. It is also desirable that the process used to synthesize the polythioether polymers be low cost, and free of malodorous and acidic byproducts. Developments in polythioether polymer chemistry have led to polymers exhibiting properties suitable for aviation and aerospace applications. For example, polythioether polymers formed by the free radical catalyzed addition reaction of vinyl ethers and polythiols as disclosed in U.S. Pat. No. 6,172,179, U.S. Pat. No. 5,959,071, and U.S. Pat. No. 5,912,319 are liquid at room temperature, exhibit excellent low-temperature flexibility and fuel resistance, and the synthesis does not generate undesirable cyclic or acidic byproducts.

It is further desirable that polythioether polymers used in aviation and aerospace sealants remain liquid at low temperatures potentially encountered, for example, during transportation and storage. Specifically, it is desirable that the polythioether polymers remain liquid at a temperature of 20° C. (68° F.), and more preferably at a temperature of 4° C. (39° F.), for an extended period of time.

In polythioether polymer systems it is known that the introduction of non-linearity into the polymer backbone, such as by incorporating pendent groups, reduces the glass transition temperature of the polymer and enhances the ability of the polymers to remain liquid at low temperatures. U.S. Pat. No. 4,366,307 discloses the incorporation of pendent alkyl side chains to provide liquid polythioether polymers with a glass transition temperature less than −50° C. U.S. Pat. No. 5,959,071 discloses incorporating pendent methyl groups into polythioether polymers to produce fuel resistant polymers that are liquid at low temperatures and that exhibit a glass transition temperature less than −50° C.

Polythioether polymers formed by the two-step addition reaction of polythiol, polyepoxide, and polyvinyl ether are disclosed in U.S. Pat. No. 6,486,297. In a first step, a polythiol is reacted with either a polyepoxide or a polyvinyl ether to form a prepolymer. In a second step, the prepolymer and un-reacted polythiol is reacted with the component not participating in the first reaction step. The polyepoxide reaction introduces pendent hydroxyl groups along the backbone of the polythioether polymer and thereby increases the non-linearity in the polymer backbone. Polythioether polymers produced using polyepoxides as disclosed in U.S. Pat. No. 6,486,297 exhibit a glass transition temperature less than −40° C. However, because the polyepoxide reaction favors polymer chain extension during the reaction, the resulting polythioether polymers are characterized by a high molecular weight and exhibit commensurate high viscosities on the order of 400 poise at room temperature. For use of polythioether polymers in curable sealant compositions, it is desirable that the polymer viscosity be on the order of 100 poise or less at room temperature.

To overcome the disadvantages inherent in polythioether polymers synthesized using polyepoxides while maintaining the properties advantageous for aviation and aerospace sealant applications, a three-step method using monoepoxides for the synthesis of polythioether polymers and sealants made therefrom, are herein disclosed.

Use of thiol addition chemistry in a three-step reaction process enables control of the polymer structure leading to polythioether polymers that exhibit low-temperature liquidity, as well as other properties desirable for aviation and aerospace sealant applications.

In a first reaction step, a polythiol can be reacted with a monoepoxide having an epoxy group and a second group, other than an epoxy group, that is reactive with a thiol group, such that the reaction takes place preferentially at the second group, to form a first prepolymer. In the first step, a thiol group adds across the double bonds of the second, non-epoxy, group to form the first prepolymer. The first prepolymer can be the 1:1 addition product of a polythiol and a monoepoxide, and comprises an epoxy group and a thiol group. Following the first reaction step, the reaction mixture comprises the first prepolymer and un-reacted polythiols.

The second reaction step comprises the ring opening of the epoxy groups by un-reacted thiol groups, typically in the presence of a catalyst, to form a second prepolymer. In the second reaction step, thiol groups on both the first prepolymer and un-reacted polythiols participate in the ring opening of the epoxy groups to form the second prepolymer. After the completion of the second reaction step, the reaction mixture comprises the second prepolymer and un-reacted starting polythiols. The second prepolymer is a polythiol having a higher molecular weight than the starting polythiols.

The third reaction step comprises the free radical-catalyzed addition of the thiol groups of both the second prepolymer and remaining un-reacted starting polythiols across the double bonds of a polyunsaturated compound such as a divinyl compound.

The three-step synthesis enables control of the molecular weight, polymer structure, and the equivalent weight, to produce polythioether polymers with consistent chemical and physical properties, and existing as a liquid at a temperature of 20° C. or less and that are useful for aviation and aerospace sealant applications. The controlled introduction of polar hydroxyl groups into the backbone of the polythioether polymer, by increasing the overall polarity of the polymer without undesirable chain extension, enhances the compatibility of the polythioether polymer with additives used in the formulation of useful sealant compositions, and also enhances the adhesion properties of the polythioether polymer to surfaces.

SUMMARY OF THE INVENTION

The embodiments of the present invention are related to polythioether polymers, processes for producing polythioether polymers, curable compositions of polythioether polymers, and the use of polythioether polymers in aviation and aerospace sealants, wherein the polythioether polymers and curable compositions are liquid at a temperature of 20° C. or less.

One aspect of the invention provides polythioether polymers of structural Formula I:

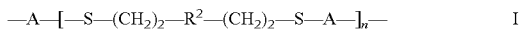

wherein
A is selected from Formulae II(a), and II(b):

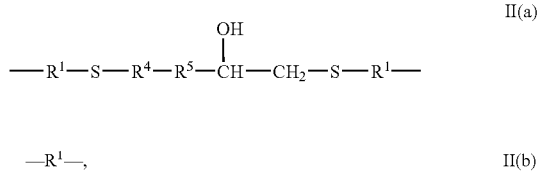

wherein
each $R^1$ is independently selected from $C_{2-6}$ n-alkylene, $C_{3-6}$ branched alkylene, $C_{6-5}$ cycloalkylene, $C_{6-10}$ alkylcycloalkylene, $-[-(CH_2)_p-X-]_q-(CH_2)_r-$, and $-[-(CH_2)_p-X-]_q-(CH_2)_r-$ in which at least one $-CH_2-$ group may be substituted with at least one methyl group, wherein
each X is independently selected from O, S, $-NH-$, and $-NR_3-$,
$R^3$ is selected from H, and $CH_3$,
p is an integer from 2 to 6,
q is an integer from 1 to 5, and
r is an integer from 2 to 10,
each $R^4$ is independently selected from $-CH_2-CH_2-$, and olefins conjugated with electron attracting groups, and
each $R^5$ is independently selected from $C_{2-10}$ alkylene, and $C_{2-10}$ alkyleneoxy,
each $R^2$ is independently selected from oxygen, $C_{2-6}$ alkyleneoxy, and $C_{5-12}$ cycloalkyleneoxy,
n is an integer selected to yield a molecular weight for the polythioether polymer of between 500 and 20,000 Daltons, and
the weight ratio of II(a) to II(b) is from about 2 to 3:1.

A second aspect of the invention provides polythioether polymers formed by: (1) reacting a polythiol with a compound comprising one epoxy group and a second group, other than an epoxy group, that is reactive with a thiol group, to form a first prepolymer, wherein the polythiol preferentially reacts with the second group; (2) reacting the first prepolymer and un-reacted polythiol with the monoepoxy group to form a second prepolymer; and, (3) reacting the second prepolymer and un-reacted polythiol with a polyvinyl compound.

A third aspect of the invention provides curable compositions of the polythioether polymers of the invention. Curable compositions of the invention generally comprise at least one polythioether polymer of the invention, at least one curing agent, and are characterized by being liquid at a temperature of 20° C. or less.

A fourth aspect of the invention provides for the use of polythioether polymers of the invention and curable compositions of the invention in sealants for aviation and aerospace applications.

DETAILED DESCRIPTION

Unless otherwise indicated, all numbers expressing quantities of ingredients, reaction conditions, and so forth used in the specification and claims are to be understood as being modified in all instances by the term "about." Accordingly, unless indicated to the contrary, the numerical parameters set forth in the following specification and attached claims are approximations that may vary depending upon the desired properties sought to be obtained by the present invention. At the very least, and not as an attempt to limit the application of the doctrine of equivalents to the scope of the claims, each numerical parameter should at least be construed in light of the number of reported significant digits and by applying ordinary rounding techniques.

Notwithstanding that the numerical ranges and parameters setting forth the broad scope of the invention are approximations, the numerical values set forth in the specific examples are reported as precisely as possible. Any numerical values, however, inherently contain certain errors necessarily resulting from the standard deviation found in the respective testing measurements.

In certain embodiments, compounds of the invention include polythioether polymers of the Formula Ia:

wherein
A is selected from Formulae II(a), and II(b)
wherein
each $R^1$, $R^2$, $R^4$ and $R^5$ are as defined above,
each $R^6$ is independently selected from a thiol group, a hydroxyl group, an amine group, and a vinyl group,
n is an integer selected to yield a molecular weight for the polythioether polymer of between 500 and 20,000 Daltons, and
the weight ratio of II(a) to II(b) is from about 2:1 to 3:1.

$R^1$ is typically derived from compounds, monomers, or polymers having at least two thiol groups. In certain embodiments, polythiols include dithiols having the structure of Formula IV:

where $R^1$ can be a $C_{2-6}$ n-alkylene group; a $C_{3-6}$ branched alkylene group having one or more pendent groups which can be, for example, hydroxyl groups, alkyl groups such as methyl or ethyl groups; an alkyleneoxy group; a $C_{6-8}$ cycloalkylene group; a $C_{6-10}$ alkylcycloalkylene group; a $-[(-CH_2)_p-X-]_q-(-CH_2)_r-$ group; or a $-[(CH_2)_p-X-]_q-(-CH_2)_r-$ group in which at least one $-CH_2-$ unit may be substituted with a methyl group, p is an independently selected integer ranging from 2 to 6, q is an independently selected integer ranging from 1 to 5, and r is an independently selected integer ranging from 2 to 10.

In other embodiments, dithiols comprise one or more heteroatom substituents in the carbon backbone, that is, dithiols in which X includes a heteroatom such as O, S, or other bivalent heteroatom radical; a secondary or tertiary amine group, i.e., $-NR^3-$, where $R^3$ is hydrogen or methyl; or other substituted trivalent heteroatom. In certain embodiments, X is O or S, and thus $R^1$ is $-[(-CH_2)_p-O-]_q-(CH_2)_r-$, or $-[(CH_2)_p-S-]_q-(-CH_2)_r-$. In certain embodiments, p and r are equal. In certain embodiments, both p and r have the value of 2.

In certain embodiments, the dithiols include dimercaptodiethylsulfide (DMDS) (p=2, r=2, q=1, X=S), dimercaptodioxaoctane (DMDO) (p=2, q=2, r=1, X=O), and 1,5-dimercapto-3-oxapentane (p=2, r=2, q=1, X=O). In certain embodiments, the dithiols comprise both heteroatom substituents in the carbon backbone and pendent alkyl groups, such as methyl groups. Examples of dithiols comprising both heteroatom substituents in the carbon backbone and pendent alkyl groups include methyl-substituted DMDS, such as HS—CH$_2$CH(CH$_3$)—S—CH$_2$CH$_2$—SH, HS—CH(CH$_3$)CH$_2$—S—CH$_2$CH$_2$—SH, and dimethyl substituted DMDS such as HS—CH$_2$CH(CH$_3$)—S—CH(CH$_3$)CH$_2$—SH and HS—CH(CH$_3$)CH$_2$—S—CH$_2$CH(CH$_3$)—SH.

In certain embodiments of a compound of Formula I, R$^1$ is a C$_{2-6}$ n-alkylene group, for example, 1,2-ethanedithiol, 1,3-propanedithiol, 1,4-butanediethiol, 1,5-pentanedithiol, or 1,6-hexanedithiol. In other embodiments, R$^1$ is a C$_{3-4}$ branched alkylene group having one or more pendent groups, for example, 1,2-propanedithiol, 1,3-butanedithiol, 2,3-butanedithiol, 1,3-pentanedithiol, and 1,3-dithio-3-methylbutane. In other embodiments, R$^1$ is a C$_{6-8}$ cycloalkylene or C$_{6-10}$ alkylcycloalkylene group, for example, dipentenedimercaptan, and ethylcyclohexyldithiol (ECHDT).

R$^2$ is typically derived from polyvinyl ethers having the Formula V:

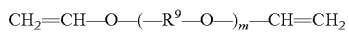  V where R$^9$ is selected from a C$_{2-6}$ n-alkylene, C$_{2-6}$ branched alkylene, C$_{6-8}$ cycloalkylene, C$_{6-10}$ alkylcycloalkylene, or a —[(CH$_2$—)$_p$—O—]$_q$—(—CH$_2$—)$_r$— group, m is a rational number from 0 to 10, p is an independently selected integer from 1 to 5, and r is an independently selected integer from 2 to 10. In certain embodiments, R$^9$ can be selected from C$_{2-6}$ alkyleneoxy and C$_{5-12}$ cycloalkyleneoxy.

In certain embodiments, polyvinyl ethers comprise compounds having at least one alkyleneoxy group, and preferably from 1 to 4 alkyleneoxy groups, such as compounds in which m is an integer from 1 to 4. In other embodiments, m is an integer from 2 to 4. In certain embodiments, the polyvinyl ethers comprise polyvinyl ether mixtures. Such mixtures are characterized by a non-integral average value of the number of alkyleneoxy groups per molecule. Thus, in certain embodiments, m in Formula V can also take on rational number values between 0 and 10.0, in other embodiments between 1.0 and 10.0, in still other embodiments between 1.0 and 4.0, and in still other embodiments between 2.0 and 4.0.

In certain embodiments, polyvinyl ether monomers comprise divinyl ether monomers, such as divinyl ether, ethylene glycol divinyl ether (EG-DVE), butanediol divinyl ether (BD-DVE), hexanediol divinyl ether (HD-DVE), diethylene glycol divinyl ether (DEG-DVE), triethylene glycol divinyl ether, tetraethylene glycol divinyl ether, polytetrahydrofuryl divinyl ether, allyl acrylate, allyl methacrylate, and vinylcyclohexene; trivinyl ether monomers such as trimethylolpropane trivinyl ether, tetrafunctional vinyl ether monomers such as pentaerythritol tetravinyl ether, and mixtures thereof. In certain embodiments, the polyvinyl ether monomer can further comprise one or more pendent groups selected from alkylene groups, hydroxyl groups, alkeneoxy groups, and amine groups.

In certain embodiments, polyvinyl ethers in which R$^9$ is a C$_{2-6}$ branched alkylene can be prepared by reacting a polyhydroxy compound with acetylene. Exemplary compounds of this type comprise compounds in which R$^9$ is an alkyl-substituted methylene group such as —CH(CH$_3$)—, for example, PLURIOL® blends such as PLURIOL®E-200 divinyl ether (BASF Corp.) for which R$^9$=ethylene and m=3.8, or an alkyl-substituted ethylene, such as —CH$_2$CH(CH$_3$)—, for example, DPE® polymeric blends including DPE-2 and DPE-3 (International Specialty Products).

R$^4$ and R$^5$ are typically derived from a monoepoxy compound having the structure of Formula VI:

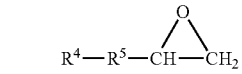  VI

R$^4$ comprises a group, other than an epoxy group, that is reactive with a thiol group. In certain embodiments, R$^4$ is derived from a —CH$_2$CH$_2$— group, and olefins conjugated with electron attracting groups such as, for example, acrylates, methacrylates, acrylonitrile, and methacrylonitrile. In certain embodiments, R$^5$ is selected from a C$_{2-10}$ alkylene group, and a C$_{2-10}$ alkyleneoxy group. In certain embodiments, R$^5$ is —CH$_2$—O—CH$_2$.

In certain embodiments, the polythioether polymers of Formulae I, I(a), III (infra), and III(a) (infra) have a molecular weight between 2,000 and 5,000 Daltons. In other embodiments, polythioether polymers of Formulae I, I(a), III, and III(a) have a molecular weight between 3,000 and 4,000 Daltons. In certain embodiments, the weight ratio of constituent A having the structure of Formula II(a) to A having the structure of Formula II(b) in the polythioether polymer is from 2:1 to 3:1.

In certain embodiments, polythioether polymers of Formula I have a glass transition temperature, T$_g$, of $-60°$ C. ($-76°$ F.) or less.

In certain embodiments, polythioether polymers of the invention are liquid at a temperature of 20° C. (68° F.) or less. In certain embodiments, polythioether polymers of the invention are liquid at a temperature of at least 4° C. (40° F.) or less and in other embodiments, are liquid at a temperature of at least 4° C. (40° F.) or less for at least one month. Typically, polythioether polymers of the invention exhibit a viscosity ranging from 75 poise to 150 poise at a temperature of 20° C. and a viscosity ranging from 300 poise to 380 poise at a temperature of 4° C. In comparison, polythioether polymers formed using diepoxides such as disclosed in U.S. Pat. No. 6,486,297 exhibit a viscosity ranging from 400 poise to 456 poise at a temperature of 20° C. and are solid at a temperature of 4° C.

In certain embodiments, compounds of the invention include polythioether polymers of the Formula III:

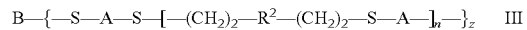  III and more particularly

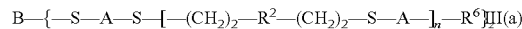  III(a)

wherein
A, R$^2$, R$^6$, and n are as described above,
B is a z-valent group derived from a polyfunctionalizing agent,
z is an integer from 3 to 6,
n is an integer selected to yield a molecular weight for the polythioether polymer of between 500 and 20,000 Daltons, and
the weight ratio of II(a) to II(b) is from about 2:1 to 3:1.

B is a z-valent group and is derived from a compound, B', that represents a polyfunctionalizing agent. A polyfunctionalizing agent refers to a compound having more than two moieties that are reactive with —SH and/or —CH=CH$_2$ groups. In certain embodiments, the polyfunctionalizing agent comprises from 3 to 6 such moieties, and B is denoted as a "z-valent" group, where z is the number of such moieties included in the agent, and hence the number of separate branches comprising the polyfunctional polythioether polymer.

In certain embodiments of a compound of Formulae III and III(a), the polyfunctionalizing agent is a trifunctionalizing agent wherein z=3. In certain embodiments of a compound of Formulae III and III(a), the functional groups of the polyfunctionalizing agent are selected from vinyl groups and thiol groups. Polyfunctionalizing agents having mixed functionality, i.e., polyfunctionalizing agents that include moieties, which typically are separate moieties, that react with both thiol and vinyl groups can also be used. In certain embodiments, the polyfunctionalizing agent comprises trimethylolpropane trivinylether, and the polythiols described in U.S. Pat. No. 4,366,307, U.S. Pat. No. 4,609,762, and U.S. Pat. No. 5,225,472. In certain embodiments, the trifunctionalizing agent is selected from triallylcyanurate (TAC), which is reactive with thiol groups, and 1,2,3-propanetrithiol, which is reactive with vinyl groups. In certain embodiments of a polythioether polymer having the structure of Formulae III and III(a), the polyfunctionalizing agent is derived from triallylisocyanurate, triallylcyanurate, or combinations thereof.

Polyfunctionalizing agents having more than three reactive moieties, i.e. z>3, afford "star" polymers and hyperbranched polymers. For example, two moles of TAC can be reacted with one mole of a dithiol to produce a polyfunctionalizing agent having an average functionality of 4. This polyfunctionalizing agent can then be reacted with a polyvinyl compound and a dithiol to yield a prepolymer, which in turn can be reacted with a trifunctionalizing agent to afford a polythioether polymer blend having an average functionality between 3 and 4.

Mixtures of polyfunctionalizing agents comprising a range of functionalities may also be used in the preparation of polythioether polymers having the structure of Formulae III and III(a). In certain embodiments, the use of certain amounts of tri functionalizing agents affords polythioether polymers having average functionalities from 2.05 to 3.0. Other average functionalities can be achieved by using tetrafunctional polyfunctionalizing agents, or polyfunctionalizing agents with higher valencies. The average functionality of the resulting polythioether polymer will also be affected by factors such as stoichiometry, as is known to those skilled in the art.

In accordance with certain embodiments of the invention, polythioether polymers of the invention are used to form curable compositions. Curable compositions of the invention comprise 30% by weight to 80% by weight of a polythioether polymer comprising at least one polythioether polymer of Formulae I, I(a), III, and III(a); at least one curing agent; and optionally, at least one filler. In certain embodiments, curable compositions of the invention are liquid at a temperature of 20° C. (68° F.) or less. In other embodiments, curable compositions of the invention are liquid at a temperature of 4° C. (40° F.) or less. In still other embodiments, curable compositions of the invention are liquid at a temperature of 4° C. (40° F.) or less for at least one month.

Curable compositions of the invention include at least one curing agent. In certain embodiments, the curing agent comprises at least one or more of the following: polyolefins, polyacrylates, metal oxides, and polyepoxides, that are co-reactive with the reactive functional groups of the polythioether polymer. Specific exemplary curing agents include hydantoin diepoxide, diglycidyl ether of bisphenol-A such as EPON 828 (Resolution Performance Products, LLC), diglycidyl ether of bisphenol-F, Novolac-type epoxides such as DEN-40® (Dow Plastics), epoxidized unsaturated phenolic resins, dimer acid-based epoxy resins, acrylic and methacrylic polyol esters, and triallylcyanurate (TAC).

Curable compositions of the invention typically comprise at least one filler. Fillers may be added to curable compositions of the invention to impart desirable physical properties such as, for example, to increase the impact strength, to control the viscosity, to modify the electrical properties, or to reduce the specific gravity. Fillers useful in the curable compositions of the invention for aviation and aerospace applications include those commonly used in the art, such as carbon black, calcium carbonate, silica, and polymer powders. Exemplary fillers include Sipernat® D-13 hydrophobic precipitated silica (Degussa), Winnofil® SPM precipitated calcium carbonate (Solvay Chemicals), TS-270 (Cabot Corporation), titanium dioxide (DuPont), aluminum hydroxide, and Orgasol® 1002 D Nat 1 ultrafine polyamide powder (Atofina Chemicals). In certain embodiments, the filler comprises from 5% by weight to 60% by weight of the non-volatile components of the curable composition.

Curable compositions of the invention may include other constituents well known by those skilled in the art. In certain embodiments, curable compositions of the invention comprise at least one additive selected from the following: plasticizers, pigments, cure accelerators, surfactants, adhesion promoters, thixotropic agents, fire retardants, and masking agents. The additive is typically present in the curable composition in amounts of 0.1 to 40% by weight based on the total weight of the curable composition.

In certain embodiments, curable compositions of the invention comprise at least one plasticizer. In certain embodiments, the plasticizer comprises at least one of the following: phthalate esters, chlorinated paraffins, and hydrogenated terphenyls. Examples of useful plasticizers include HB-40® modified polyphenyl (Solutia, Inc.), and tung oil (Campbell & Co.). In certain embodiments, the plasticizer comprises from 1% by weight to 40% by weight of the total weight of the curable composition. In other embodiments, the plasticizer comprises from 1% by weight to 8% by weight of the total weight of the curable composition.

In certain embodiments, curable compositions of the invention comprise at least one pigment. In certain embodiments, the pigment comprises at least one of the following: carbon black, metal oxides, and calcium carbonate. Pigment grade carbon black generally is characterized by low structure and particle size such as Regal® 660R (Cabot Corporation). Brilliant 1500 is an example of pigment grade, 99.995$^+$%, calcium carbonate (Aldrich Chemical). In certain embodiments, the pigment comprises from 0.1% by weight to 10% by weight of the total weight of the curable composition. In other embodiments, the pigment comprises from 0.1% by weight to 5% by weight of the total weight of the curable composition.

In other embodiments, such as where the curable composition comprises epoxy curing agents, curable compositions of the invention include at least one cure accelerator or catalyst. In certain embodiments, the cure accelerator comprises at least one of the following organic amine catalysts: triethylamine (TEA), 1,8-diazabicyclo[5.4.0]undec-7-ene (DBU), 2,4,6-tris(dimethylaminomethyl)phenol (DMP-30), 1,1,3,3-tetramethylguanidine (TMG), carbamate paste (PRC-DeSoto International), and 1,4-diazabicylco[2.2.2]octane (DABCO) (Air Products). In certain embodiments, such as for reacting silanes, the catalyst can be, for example, titanate TBT (DuPont). In certain embodiments, the cure accelerator comprises from 0.1% by weight to 5% by weight of the total weight of the curable composition.

In certain embodiments, curable compositions of the invention comprise one or more adhesion promoters and coupling agents. Adhesion promoters and coupling agents enhance adhesion of the polythioether polymer and other polymeric components of the curable composition to particulate additives as well as to substrate surfaces. Examples of adhesion promoters include phenolics such as Methylon 75108 phenolic resin (Occidental Chemical Corp.), and organosilanes comprising epoxy, mercapto or amino functionalities such as Silquest A-187® (8-glycidoxypropyl trimethoxysilane) and Silquest A-1100® (8-aminopropyltrimethoxysilane) (OSi Specialties). Other useful adhesion promoters include organic titanates such as, for example, Tyzor®tetra n-butyl titanate (TBT) (Dupont), hydrolyzed silane (PRC-DeSoto International), and phenolic cook (PRC-DeSoto International). In certain embodiments, the adhesion promoter comprises from 0.1% by weight to 15% by weight of the total weight of the composition. In certain embodiments, the adhesion promoter comprises from 0.1% by weight to 5% by weight of the total weight of the composition In still other embodiments, curable compositions of the invention comprise at least one thixotropic agent. A thixotropic agent stabilizes the viscosity of the curable composition in response to sheer stress. In certain embodiments, the thixotropic agent comprises at least one of the following: fumed silica, and carbon black. In certain embodiments, the thixotropic agent comprises from 0.1% by weight to 5% by weight of the total weight of the curable composition.

In other embodiments, curable compositions of the invention comprise at least one fire retardant. A fire retardant reduces the combustibility of the cured composition. In certain embodiments, the fire retardants comprise from 0.1% by weight to about 5% by weight of the total weight of the curable composition.

In still other embodiments, curable compositions of the invention include at least one masking agent, such as pine fragrance or other scents, which are useful in covering any undesirable low-level odor of the curable composition. In certain embodiments, the at least one masking agent comprises from 0.1% by weight to 1% by weight of the total weight of the curable composition.

In certain embodiments, curable compositions of the invention further comprise at least one volatile organic solvent, such as isopropyl alcohol. The organic solvent is included to reduce the viscosity of the curable composition during application and rapidly evaporates following application. In certain embodiments, the at least one organic solvent comprises from 0% by weight to 15% by weight of the total weight of the curable composition, and in other embodiments from 10% by weight to 15% by weight of the curable composition.

Curable compositions of the invention are liquid at a temperature of 20° C. (68° F.) or less. In certain embodiments, curable compositions of the invention are liquid at a temperature of at least 4° C. (40° F.) or less. In other embodiments, curable compositions of the invention are liquid at a temperature of 4° C. (40° F.) or less for at least one month. The ability of curable compositions to remain liquid for an extended period of time at low temperatures facilitates storage and transportation of the curable compositions for practical use, such as, for example, in aviation and aerospace sealant applications.

When cured, curable compositions of the invention exhibit properties advantageous in aviation and aerospace applications. For aviation and aerospace sealant applications it is desirable that the cured sealant exhibit at least the following properties: (1) tensile strength from 300–400 psi; (2) tear strength greater than 50 psi; (3) elongation from 250% to 300%; (4) hardness (Rex) greater than 40; (5) peel strength under dry conditions, following immersion in JRF, and following immersion in 3% NaCl greater than 20 pli. In certain embodiments, curable compositions of the invention are curable at a temperature of 20° C. (68° F.) or less, and when cured, curable compositions of the invention exhibit a percent volume swell not greater than 25% following immersion for one week in JRF type I at a temperature of 60° C. (140° F.) and atmospheric pressure.

Certain embodiments of the invention include a process for forming linear polythioether polymers having the structure of Formula I. In certain embodiments, polythioether polymers of the invention having the structure of Formula I are formed by the process of: (1) reacting a polythiol with a compound comprising one epoxy group and a second group, other than an epoxy group, that is reactive with a thiol group, to form a first prepolymer, wherein the polythiol preferentially reacts with the second group; (2) reacting the first prepolymer and un-reacted polythiol with the monoepoxy group, optionally in the presence of a catalyst, to form a second prepolymer; and, (3) reacting the second prepolymer and un-reacted polythiol with a polyvinyl compound.

In a first step, a polythiol can be reacted with a monoepoxide comprising one epoxy group and a second group, other than an epoxy group, that is reactive with a thiol group to form a first prepolymer. The reaction conditions are established such that the polythiol preferentially reacts with the second group, or the non-epoxy group, of the monoepoxide.

In the first step, a thiol group can add across double bonds of the second, non-epoxy, group to form the first prepolymer. The first prepolymer can be the 1:1 addition product of the polythiol and the monoepoxide, and comprises an epoxy group and a thiol group. Following the first reaction step, the reaction mixture comprises the first prepolymer and un-reacted polythiol.

In certain embodiments, the polythiol and monoepoxide are reacted at a temperature of 70° C. for 1 hour. In certain embodiments, the polythiol is present in an amount of from 40 to 80 mole percent, and in other embodiments from 50 to 60 mole percent. In certain embodiments, the monoepoxide is present in an amount of from 5 to 25 mole percent, and in other embodiments from 10 to 15 mole percent. The mole percentage is based on total moles of reactants used in forming the polythioether polymer.

The polythiol comprises any compound, polymer, or monomer having at least two thiol groups, and includes any of the exemplary polythiol compounds previously described. In certain embodiments, the polythiol is a dithiol compound. In certain embodiments, the polythiol comprises a mixture of polythiol compounds. In other embodiments, the polythiol comprises at least one or more of dimercaptodioxaoctane, and a combination of dimercaptodioxaoctane and dimercaptodiethylsulfide.

In certain embodiments, the group that is reactive with a thiol group, other than an epoxy group, is a vinyl group. In certain embodiments, the compound containing one epoxy group and a group that is reactive with a thiol group, other than an epoxy group, used in the preparation of compounds of Formula I is allyl glycidyl ether. Other useful monoepoxide compounds include, for example, glycidyl acrylate and glycidyl methacrylate.

In a second reaction step, the first prepolymer and un-reacted polythiol remaining from the first reaction step are reacted with the epoxy group, optionally in the presence of a catalyst, to form a second prepolymer. The second reaction step comprises the ring opening of the epoxy groups by un-reacted thiol groups. In the second reaction step, thiol groups on both the first prepolymer and un-reacted polythiols participate in the ring opening of the epoxy groups to form the second prepolymer. After the completion of the second reaction step, the reaction mixture comprises higher molecular weight polythiols as the second prepolymer and un-reacted starting polythiols.

In certain embodiments, the optional catalyst comprises a basic catalyst such as, for example, triethylamine (TEA), 1,4-diazabicylco[2.2.2]octane (DABCO), 1,8-diazabicyclo [5.4.0]undec-7-ene (DBU), pyridine, and substituted pyridine. In certain embodiments, the second reaction step is carried out at a temperature of from 20° C. to 80° C. for from 2 to 6 hours.

In a third reaction step, a polyvinyl compound can be reacted with the second prepolymer and un-reacted polythiol. The third reaction step comprises the free radical-catalyzed addition of thiol groups of both the second prepolymer and remaining un-reacted starting polythiols across the double bonds of a polyunsaturated compound such as a divinyl compound. In certain embodiments, the polyvinyl ether compound is a polyvinyl ether.

The polyvinyl ether may be any of the polyvinyl ethers previously disclosed. In certain embodiments, the polyvinyl ether used in the preparation of the compounds having the structure of Formula I is diethylene glycol divinyl ether. In other embodiments, the polyvinyl ether is selected from allyl acrylate, allyl methacrylate, and vinylcyclohexene. In certain embodiments, the divinyl ether is present in an amount from 5 to 25 mole percent, and in other embodiments the polyvinyl ether is present in an amount from 10 to 20 mole percent, with the mole percentage being based on the total moles of reactants. The total amount of polyvinyl ether is typically added to the reaction mixture at intervals over 1 hour. After the reaction has proceeded to near completion, a free radical initiator such as Vazo®67 (2,2'-azobis(2-methylbutyronitrile) (DuPont) in an amount of from 0.001% to 0.10% by weight of the polyvinyl ether is added to complete the reaction.

In certain embodiments, the catalyst used in the third reaction step comprises at least one or more free-radical catalyst. In certain embodiments, the free-radical catalyst used in the preparation of polythioether polymers having the structure of Formula I includes azo(bis)isobutyronitrile (AIBN), and organic peroxides such as benzoyl peroxide, and t-butyl peroxide.

In certain embodiments, the third reaction step is carried out at a temperature of from 60° C. to 80° C. for from 6 to 24 hours.

Certain embodiments of the invention include a process for forming branched polythioether polymers having the structure of Formulae III and III(a). In certain embodiments, polythioether polymers of the invention having the structure of Formulae III and III(a) are formed by the process of: (1) reacting a polythiol with a compound comprising one epoxy group and a second group, other than an epoxy group, that is reactive with a thiol group, to form a first prepolymer; (2) reacting the first prepolymer and un-reacted polythiol with the epoxy group, optionally in the presence of a catalyst, to form a second prepolymer; and, (3) reacting a polyvinyl compound and a polyfunctionalizing agent with the second prepolymer and un-reacted polythiol.

To prepare branched polythioether polymers, at least one polyfunctionalizing agent is included in the third reaction step. Examples of polyfunctionalizing agents have been previously disclosed. In certain embodiments, the polyfunctionalizing agent is trifunctional, and more specifically, the polyfunctionalizing agent is triallylcyanurate (TAC). In certain embodiments, the trifunctionalizing agent is present in an amount of from 0.5 to 4 mole percent, and preferably from 1 to 3 mole percent. Use of polyfunctionalizing agents produces a polythioether polymer having a functionality greater than 2. In certain embodiments, polythioether polymers formed by the processes of the invention have an average functionality between 2.05 and 3.0.

Since the reaction of the polyvinyl compound with the polythiol is an addition reaction, the reaction typically proceeds substantially to completion, i.e. no or substantially no undesirable by-products are produced. In particular, the process of forming polythioether polymers of the invention does not produce appreciable amounts of malodorous cyclic by-products. Moreover, polythioether polymers prepared according to the processes of the invention are typically substantially free of residual catalyst.

In certain embodiments, polythioether polymers of the invention exhibit a viscosity of less than 200 poise at a temperature of 25° C. and a pressure of 760 mm Hg as determined according to ASTM D-2849 §79-90 using a Brookfield viscometer. In certain embodiments, polythioether polymers of the invention exhibit a viscosity of less than 400 poise at a temperature of 4° C.

In certain embodiments, capped analogs to the polythioether polymer having the structure of Formulae I(a) and III(a) can be prepared by further reacting a compound having the structure of Formula VII, or a mixture of two different compounds having the structure of Formula VII, in the third reaction step:

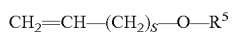
$$CH_2=CH-(CH_2)_S-O-R^5 \qquad\qquad VII$$

Compounds of Formula VII are alkyl ω-alkenyl ethers having a terminal ethylenically unsaturated group which can react with terminal thiol groups to cap the polythioether polymer.

In Formula VII, s is an integer from 0 to 1, preferably 0 to 6, more preferably 0 to 4, and $R^5$ is an un-substituted or substituted alkylene group, preferably a $C_{1-6}$ n-alkylene group which can be substituted with at least one —OH or —$NHR^7$ group, with $R^7$ denoting H or a $C_{1-6}$ alkylene group. Exemplary useful $R^5$ groups include alkylene groups, such as ethylene, propylene, and butylene; hydroxyl-substituted groups such as 4-hydroxybutylene; and, amine substituted groups such as 3-aminopropylene.

Specific compounds of Formula VII are monovinyl ethers (s=0), including amino-and hydroxyalkyl vinyl ethers, such as 3-aminopropyl vinyl ether and 4-hydroxybutyl vinyl ether (butanediol monovinyl ether), as well as un-substituted alkyl vinyl ethers such as ethyl vinyl ether. Additional preferred compounds of Formula VII include allyl ethers (s=1), such as 4-aminobutyl allyl ether, 3-hydroxypropyl allyl ether.

Use of equivalent amounts of compounds of Formula VII relative to thiol groups present in Formula III provides fully capped polythioether polymers, while use of lesser amounts results in partially capped polymers.

Curable compositions within the scope of the invention may be advantageously used as aviation and aerospace sealants where low temperature flexibility, low temperature liquidity, and resistance to aviation fuel are important attributes. Curable compositions of the invention can be applied to a surface by any means known to those skilled in the art including brushing, rolling, and spraying.

Curable compositions of the invention are cured according to recommended procedures and, in certain embodiments, at ambient temperature. In certain embodiments, the curable compositions are curable at a minimum temperature of 0° C. In other embodiments, the curable compositions are curable at a minimum temperature of −10° C. In still other embodiments, the curable compositions are curable at a minimum temperature of −20° C. By "curable" is meant capable of undergoing one or more chemical reactions to form stable, covalent bonds among the constituent components.

When cured, curable compositions of the invention exhibit properties advantageous for use as sealants as aviation and aerospace applications. In general, it is desirable that sealants used in aviation and aerospace applications exhibit the following properties: peel strength greater than 20 pounds per linear inch (pli) on Military Specification C (Mil-C) substrates determined under dry conditions, following immersion in JRF for 7 days, and following immersion in a solution of 3% NaCl according to test specifications Mil-C-27725 and Mil-A-8625; tensile strength between 300 pounds per square inch (psi) and 400 psi; tear strength greater than 50 pounds per linear inch (pli); elongation between 250% and 300%; and hardness greater than 40 Rex. It is also desirable that when cured, curable compositions of the invention exhibit a percent volume swell not greater than 25% after immersion for one week at 60° C. (140° F.) and ambient pressure in JRF type 1.

As shown in the following examples, when cured, curable compositions of the invention meet or exceed the desired properties for use as aviation and aerospace sealants. In contrast, as presented in Example 5, cured sealants comprising a polythioether polymer synthesized using a diepoxide, rather than a monoepoxide as in the embodiments of the invention, exhibit peel strengths less than 20 pli following immersion in JRF for 7 days, and following immersion in a solution of 3% NaCl according to Mil-C-27725 and Mil-A-8625.

EXAMPLES

Reference will now be made in detail to specific embodiments of the invention. While certain embodiments of the invention will be described in conjunction with the preferred embodiments, it will be understood that it is not intended to limit the embodiment of the invention to those preferred embodiments. To the contrary, it is intended to cover alternatives, modifications, and equivalents as may be included within the spirit and scope of the embodiments of the invention as defined by the appended claims.

In the examples below, the following abbreviations have the following meanings. If an abbreviation is not defined, it has its generally accepted meaning.

| | |
|---|---|
| AGE = | allyl glycidyl ether |
| % CF = | percent cohesive failure |
| DABCO = | 1,4-diazabicyclo[2.2.2]octane |
| DBU = | 1,8-diazabicyclo[5.4.0]undec-7-ene |
| DEG-DVE = | diethylene glycol divinyl ether |
| DMDO = | dimercaptodioxaoctane |
| DMDS = | dimercaptodiethylsulfide |
| g = | gram |
| epoxy/HS = | epoxy/mercaptan ratio |
| JRF = | jet reference fuel |
| ml = | milliliter |
| mm Hg = | millimeters of mercury |
| pli = | pounds per linear inch (kg/cm) |
| psi = | pounds per square inch |
| TAC = | triallylcyanurate |

The following tests were used to characterize certain curable compositions of the invention:

Peel strength was determined according to Mil-C-27725 and Mil-A-8625. Adhesion test panels are prepared by applying a layer of sealant to a metal substrate such as aluminum, steel, or titanium, applying a screen over the sealant, and applying a top layer of sealant over the screen. After curing, a cut is made between the screen and metal substrate, the screen pulled, and the peel pattern visually characterized. A desirable pattern occurs when part of the sealant adheres to the metal, and part of the sealant adheres to the screen along the cut. This pattern allows the determination of the peel strength expressed as pulling force/percent cohesive failure. Screen failure is defined as occurring when the sealant layer peels from the screen but remains adhered to the metal substrate, thus indicating that the sealant has superior adhesion to the metal surface compared to the screen. Screen failure does not permit a determination of peel strength of the sealant to a metal substrate.

Low temperature flexibility was determined by methods known in the art such as in AMS 3267 §4.5.4.7, MIL-S-880E §3.3.12, and as described in ASTM D522.58.

Percent swell was determined according to procedures described in ASTM D792 and AMS 3269. For certain applications it is desirable that the percent swell not be greater than 25% and preferably not greater than 20% after immersion for 1 week at 60° C. (140° F.) and ambient temperature and atmospheric pressure in JRF type 1.

Tensile strength and elongation were determined according to MMS 332 4.4.13.2 and AMS 3277 4.5.24.

Hardness was determined according to MMS 332 4.4.18 and AMS 3277 4.5.5.

Viscosity was determined according to MMS 332 4.4.4 and AMS 3277 4.5.8.

Storage temperature was determined according to MMS 4.4.14 and AMS 3277 4.5.33.

Liquidity or flow was determined according to MMS 4.4.5 and AMS 3277 4.5.9.

The following metal substrates relevant to aviation and aerospace applications were used to characterize curable compositions of the invention. Alclad is a composite material formed by roll-bonding a relatively thin pure aluminum layer to the outer surface of a high-strength core aluminum alloy. Alodine® is a proprietary process (Henkel) for producing a chrome conversion coating on aluminum and aluminum alloys. Both Alclad and Alodine® surfaces are corrosion resistant. The bare aluminum surfaces used for evaluation of curable compositions of the invention were in compliance with AMS 4045. The steel surfaces used were in compliance with AMS 5516-302, and the titanium surfaces were chemically pure annealed titanium in compliance with AMS 4901.

Example 1

A 1 liter 4-neck flask was charged with 284.07 g (1.56 moles) of DMDO and 60.13 g (0.38 mole) of DMDS followed by 43.82 g (0.38 mole) of AGE while stirring. The mixture was stirred for 40 minutes. Triethylamine (0.18 g, 0.0018 mole) was added and the mixture was heated at 70° C. for 2 hours. A solution of 9.48 g (0.038 mole) of TAC, and 204.94 g (1.30 mole) of DEG-DVE was then added over 30 minutes at 70° C. The mixture was then stirred at 70° C. for an additional 30 minutes. Seven portions of free radical initiator Vazo®67 (2,2'-azobis(2-methylbutyronitrile)) (DuPont) (0.145 g, 0.024% of total charge) were added at one-hour intervals while the temperature of the reaction mixture was maintained at 70° C., to complete the reaction. The reaction mixture was then degassed at 70° C./0.5 mm Hg for 2 hours to provide a liquid polythioether, Polymer 1, of faint yellow color and low odor, exhibiting a viscosity of 92 poise. The reaction yield was 602 g (100%). The polythioether polymer remained liquid for 56 days at a temperature of 4° C. (39° F.).

The polythioether, Polymer 1, was formulated into a base, Base 1, that was later cured with an epoxy accelerator. The composition of the base comprising polythioether Polymer 1 is presented in Table 1.

TABLE 1

Composition of Base 1.

| Base Component | Amount (g) |
| --- | --- |
| Polythioether Polymer 1 | 100.00 |
| Phenolic Resin | 1.50 |
| Phenolic Adhesion Promoter | 1.00 |
| Titanate TBT | 0.50 |
| DABCO Catalyst | 0.80 |
| Tung Oil | 0.50 |
| Al100 Silane Adhesion Promoter | 2.00 |
| Silica | 0.40 |
| Titanium Dioxide | 1.00 |
| Sipernat ® D-13 | 1.50 |
| Aluminum Hydroxide | 15.00 |
| Calcium Carbonate | 55.00 |

The components of the accelerator composition, Accelerator 1, are presented in Table 2.

TABLE 2

Composition of Accelerator 1.

| Accelerator Component | Amount (g) |
| --- | --- |
| Epon 828 | 50.00 |
| DEN-431 | 50.00 |
| Hydrogenated Terphenyl | 24.00 |
| Calcium Carbonate | 90.00 |
| Carbon Black | 0.50 |
| Al100 Silane Adhesion Promoter | 5.30 |

Base 1 and Accelerator 1 were mixed in an epoxy/HS equivalent ratio of 1:1.05. The physical properties of the resultant sealant were determined after curing for 7 days at a temperature of 25° C. (77° F.).

TABLE 3

Physical Properties of the Polythioether Base 1 Cured Using Accelerator 1.

| Property | Values |
| --- | --- |
| Tensile (psi) | 323 |
| Tear (pli) | 49 |
| Elongation (%) | 310 |
| Hardness (Rex) | 60 |
| Dry Peel (pli, Mil-C surface) | 38 |

Example 2

A 1 liter 4-neck flask was charged with 429.57 g (2.23 moles) of DMDO followed by 73.65 g (0.64 moles) of AGE while stirring. The mixture was stirred for 1 hour. Triethylamine (0.21 g, 0.002 mole) was added and the mixture was heated at 70° C. for 2.5 hours. A solution of 21.23 g (0.085 mole) of TAC and 209.38 g (1.32 moles) of DEG-DVE was then added over a period of 1 hour at 70° C. The mixture was stirred at 70° C. for an additional 1 hour. Six portions of Vazo®67 (0.33 g, 0.024% of total charge) were then added, at one-hour intervals, while maintaining the temperature at 70° C., to complete the reaction. The mixture was then degassed at 70° C./0.5 mm Hg for 2 hours to provide a liquid polythioether, Polymer 2, of faint yellow color and low odor, exhibiting a viscosity of 114 poise. The yield was 734 g (100%). The polythioether polymer remained liquid for 63 days at a temperature of 4° C. (39° F.).

Polythioether Polymer 2 was formulated into a base, Base 2, as in Example 1. Base 2 was cured with the accelerator of Example 1 as well as with an accelerator of a different composition to improve the peel properties. In both cure compositions the epoxy/HS ratio was 1:1.05. The composition of Accelerator 2 is provided in Table 4.

TABLE 4

Composition of Accelerator 2

| Accelerator Component | Amount (g) |
| --- | --- |
| Epon 828 | 60.00 |
| DEN-431 | 40.00 |
| Epon Resin 836-C-75 | 30.00 |
| Hydrogenated Terphenyl | 24.00 |
| Calcium Carbonate | 95.00 |
| Carbon Black | 0.50 |
| Al100 Silane Adhesion Promoter | 5.00 |

The adhesion of the resulting sealant compositions was evaluated using the peel strength test according to Mil-C-27725 and Mil-A-8625. Test panels (Mil-C substrate) were prepared and immersed in either JRF type 1 or 3% aqueous sodium chloride (NaCl) solution for 7 days at 60° C. (140° F.) prior to determining the peel strength. The peel strength (pli/% cohesive failure) of the test specimens are provided in Table 5.

TABLE 5

Peel Strength of Sealants Comprising Polythioether Base 2 and Different Accelerators.

| Immersion Fluid | Accelerator (Example 2) | Accelerator (Example 1) |
| --- | --- | --- |
| None (Dry) | 50/100% CF | 35/100% CF |
| JRF Type 1 | 30/100% CF | 20/100% CF |
| 3% Aqueous NaCl | 32/100% CF | 23/100% CF |

Example 3

A 5 liter 4-neck flask was charged with 2356.4 g (12.83 moles) of DMDO followed by 403.56 g (3.5 moles) of AGE while stirring. The mixture was heated at 70° C. for 1 hour. Triethylamine (0.69 g, 0.0068 mole) was added and the mixture was heated at 70° C. for 3.5 hours. A solution of 116.35 g (0.46 mole) of TAC and 1147.28 g (7.25 moles) of DEG-DVE was added over 2.5 hours at 70° C. The mixture was stirred at 70° C. for an additional 1 hour. Nine portions of Vazo®67 (0.33 g, 0.008% of total charge) were added at one-hour intervals at a temperature of 70° C., to complete the reaction. The mixture was degassed at 70° C./0.5 mm Hg for 2 hours to provide a liquid polythioether, Polymer 3, of faint yellow color and low odor, exhibiting a viscosity of 160 poise. The yield was 4.023 Kg (100%). The polythioether polymer remained liquid for at least 365 days at a temperature of 4° C. (39° F.).

Polythioether Polymer 3 was formulated into a base, Base 3, similar to that in Example 1, and cured using different epoxy/mercaptan ratios, with an accelerator, Accelerator 3, having the composition presented in Table 6.

TABLE 6

Composition of Accelerator 3.

| Accelerator Component | Amount (g) |
| --- | --- |
| Epotuf ® AD-1045 | 100.00 |
| Hydrogenated Terphenyl | 24.00 |
| Calcium Carbonate | 90.00 |
| Carbon Black | 0.50 |
| Carbamate Paste | 0.40 |
| Hydrolyzed Silane | 5.30 |

The peel strength of the cured sealant comprising Base 3 and different amounts of Accelerator 3 representing a range of epoxy/HS equivalent ratios to produce various epoxy/mercaptan ratios on Mil-C surfaces was evaluated both dry and following immersion in JRF Type 1 for 7 days at 60° C. (140° F.). The results are provided in Table 7.

TABLE 7

Peel Strength of Sealant Compositions of Base 3 and Different Amounts of Accelerator 3.

| Epoxy/HS Ratio | Peel (Dry) | Peel (JRF Type 1) |
| --- | --- | --- |
| 1.00 | 42/100% CF | 36/100% CF |
| 1.05 | 43/100% CF | 36/100% CF |
| 1.10 | 47/100% CF | 33/100% CF |
| 1.15 | 33/100% CF | 27/100% CF |
| 1.20 | 33/100% CF | 30/100% CF |

As demonstrated by the results presented in Table 5 and Table 7, the adhesion of the cured sealant composition is influenced by the composition of the accelerator as well as by the epoxy/mercaptan ratio.

Example 4

A 5 liter 4-neck flask was charged with 2356.4 g (12.83 moles) of DMDO followed by 403.56 g (3.5 moles) of AGE while stirring. The mixture was stirred for 1.5 hours. During this period, the reaction temperature increased to 49° C. (120° F.). A solution of base catalyst (2.9 g in 0.5 ml toluene), 1,8-diazabicyclo[5.4.0]undec-7-ene (DBU) was added to the reaction mixture. The exothermic reaction produced a temperature of 100° C. in 0.5 hours. The reaction mixture was cooled to 70° C. and stirred for an additional 2 hours. A solution of 116.35 g (0.46 mole) of TAC, 1147.28 g (7.25 moles) of DEG-DVE, and 0.2 g of Vazo®67 was added over 2 hours at 70° C. The reaction mixture was then stirred at 70° C. for an additional 1 hour. Ten portions of Vazo®67 (0.6 g, 0.015% of total charge) were added at one-hour intervals at a temperature of 70° C., to complete the reaction. The mixture was degassed at 70° C./0.5 mm Hg for 2 hours to provide a liquid polythioether, Polymer 4, of faint yellow color and low odor exhibiting a viscosity of 145 poise. The yield was 4.023 Kg (100%). The polythioether polymer remained liquid for at least 365 days at a temperature of 4° C. (39° F.).

Further adjustments were made in the compositions of both the bases and accelerators. The compositions of five bases formed using polythioether Polymer 4 are presented in Table 8.

TABLE 8

Base Compositions Formed Using Polythioether Polymer 4.

| Base Component | Base A | Base B | Base C | Base D | Base E | Base F |
| --- | --- | --- | --- | --- | --- | --- |
| Polythioether Polymer 4 | 100.00 | 100.00 | 100.00 | 100.00 | 100.00 | 100.00 |
| Methylon 75108 | 1.50 | 1.50 | 1.50 | 1.40 | 1.50 | 1.50 |
| Phenolic Cook | 1.00 | 1.00 | 2.00 | 1.20 | 1.20 | 1.20 |
| Titanate TBT | 0.80 | 0.80 | 0.80 | 0.80 | 0.80 | 0.80 |
| A-1100 | 1.80 | 1.80 | 1.80 | 1.80 | 1.80 | 1.80 |
| DABCO | 0.50 | 0.30 | 0.30 | 0.30 | 0.30 | 0.40 |
| Tung Oil | 0.50 | 0.50 | 0.50 | 0.50 | 0.50 | 0.50 |
| Ti Pure | 0.80 | 0.80 | 0.80 | 0.80 | 1.00 | 1.50 |
| Sipernat ® D-13 | 1.50 | 1.50 | 1.50 | 1.40 | 1.70 | 1.70 |
| Aluminum Hydroxide | 10.00 | 12.00 | 12.00 | 11.00 | 10.00 | 9.00 |
| Winnofil SPM | 45.00 | 40.00 | 40.00 | 40.00 | 40.00 | 37.00 |
| TS-270 | 0.50 | 0.30 | 0.30 | 0.30 | 0.50 | 0.50 |
| Orgasol 1002 D Nat 1 | 10.00 | 0.00 | 0.00 | 0.00 | 0.00 | 8.00 |
| Brilliant 1500 | 0.00 | 15.00 | 15.00 | 12.00 | 10.00 | 0.00 |
| HB-40 | 1.10 | 1.50 | 1.50 | 1.04 | 3.00 | 3.10 |

Base compositions A, B, and C were cured with an accelerator, Accelerator 4A, having the composition presented in Table 9.

TABLE 9

Composition of Accelerator 4A.

| Accelerator Component | Amount (g) |
| --- | --- |
| Epon 828 | 80.00 |
| DEN-431 | 20.00 |
| HB-40 | 24.00 |
| Carbamate Paste | 0.40 |
| Regal 660R | 0.50 |
| Brilliant 1500 | 100.00 |
| Hydrolyzed Silane | 5.30 |

Following curing for one week at a temperature of 25° C. (77° F.), the hardness of the sealants formed using base compositions A, B, and C, and Accelerator 4A, was 53–55 Rex.

Base compositions B, C, and D were cured with an accelerator, Accelerator 4B, having the composition presented in Table 10.

TABLE 10

Composition of Accelerator 4B.

| Accelerator Component | Amount (g) |
| --- | --- |
| Epon 828 | 80.00 |
| DEN-431 | 20.00 |
| HB-40 | 30.00 |
| Brilliant 1500 | 60.00 |
| Winnofil SPM | 30.00 |
| Regal 660R | 1.00 |
| Carbamate Paste | 0.50 |
| Hydrolyzed Silane | 5.50 |

The peel strength (pli/% CF) of the sealants formed using base compositions B, C, and D, and Accelerator 4B, on Mil-C, Alodine®, and titanium surfaces according to Mil-C-27725 and Mil-A-8625 are presented in Table 11.

TABLE 11

Peel Strength of Sealants prepared using Base Compositions B, C, and D, and Accelerator 4B.

| Surface/Fluid | Base B | Base C | Base D |
|---|---|---|---|
| Mil-C/Dry | 57/100% CF | 66/100% CF | 50/100% CF |
| Mil-C/JRF | 34/100% CF | 36/100% CF | 32/100% CF |
| Alodine/Dry | 63/100% CF | 63/100% CF | 51/100% CF |
| Alodine/JRF | 33/100% CF | 36/100% CF | 38/100% CF |
| Titanium III/Dry | 70/100% CF | 69/100% CF | 47/100% CF |
| Titanium III/JRF | 34/100% CF | 43/100% CF | 28/100% CF |

Base compositions B and E were also cured with an accelerator, Accelerator 4C, having the composition presented in Table 12.

TABLE 12

Composition of Accelerator 4C.

| Accelerator Component | Amount (g) |
|---|---|
| Epon 828 | 80.00 |
| DEN-431 | 20.00 |
| HB-40 | 30.00 |
| Brilliant 1500 | 40.00 |
| Winnofil SPM | 30.00 |
| Regal 660R | 1.00 |
| Carbamate Paste | 0.50 |
| Hydrolyzed Silane | 6.40 |

The peel strength (pli/% CF) of sealants formed using base compositions B and E, and Accelerator 4C are presented in Table 13.

TABLE 13

Peel Strength of Sealants Formed Using Base Compositions B and E, and Accelerator 4C.

| Surface/Fluid | Base B | Base E |
|---|---|---|
| Steel/Dry | 81/100% CF | 89/100% CF |
| Steel/JRF | 49/100% CF | 51/100% CF |
| Alcalad/Dry | 73/100% CF | 74/100% CF |
| Alcalad/NaCl | 54/100% CF | 42/100% CF |
| Bare Aluminum/Dry | 90/100% CF | 77/100% CF |
| Bare Aluminum/JRF | 48/100% CF | 38/100% CF |

Example 5

In Example 5, a polythioether polymer was synthesized using a diepoxide to compare the performance of sealants comprising polythioether polymers synthesized using diepoxides with sealants comprising polythioether polymers synthesized using monoepoxides.

A solution of neopentyl glycol diglycidyl ether (162.13 g, 0.58 mole), DMDO (483.81 g, 2.64 moles), and triethylamine (0.3 g, 0.003 mole) was heated at 100° C. for 16 hours, cooled to room temperature, and charged in a 1 liter 4-neck round bottom flask. TAC (14.38 g, 0.058 mole) and DEG-DVE (264.69 g, 1.67 moles) were added and the reaction mixture was heated to 70° C. Three portions of Vazo®67 (0.3 g, 0.032% of total charge) were added at one-hour intervals at a temperature of 70° C., to complete the reaction. The reaction mixture was then degassed at 70° C./0.5 mm Hg for 2 hours to provide a liquid polythioether, Polymer 5, of faint yellow color and low odor, exhibiting a viscosity of 87 poise at 25° C. The reaction yield was 925 gm (100%). The polythioether polymer remained liquid for 35 days at a temperature of 4° C. (39° F.).

A base composition, Base 5, having the same constituents as in Example 1 was formulated using the polythioether formed in Example 5, rather than the monoepoxide polythioether described in Example 1. Base 5 was cured using three different accelerators in an epoxy/HS equivalent ratio of 1:1.05. The compositions of the accelerators used to form sealants using Base 5 are presented in Table 14.

TABLE 14

Composition of Accelerators 1, 5A, and 5B.

| Component | Accelerator 1 | Accelerator 5A | Accelerator 5B |
|---|---|---|---|
| Epon 828 | 50.00 | 0.00 | 40.00 |
| DEN-431 | 50.00 | 100.00 | 60.00 |
| Hydrogenated Terphenyl | 24.00 | 24.00 | 24.00 |
| Calcium Carbonate | 90.00 | 90.00 | 90.00 |
| Carbon Black | 0.50 | 0.50 | 0.50 |
| Silane Adhesion Promoter | 5.30 | 5.30 | 5.30 |

The peel strength (pli/% CF) of the sealants on Mil-C substrates was determined under dry conditions, following immersion in JRF for 7 days, and following immersion in a solution of 3% NaCl according to Mil-C-27725 and Mil-A-8625 are presented in Table 15.

TABLE 15

Peel Strength of Sealants Formed Using Base Composition 5 and Different Accelerators 1, 5A, and 5B.

| Base/Accelerator | Dry (pli/% CF) | JRF (7 days) (pli/% CF) | 3% NaCl (pli/% CF) |
|---|---|---|---|
| 5/1 | 23/100% CF | 8/100% CF | 9/100% CF |
| 5/5A | 31/screen failure | 17/100% CF | 13/100% CF |
| 5/5B | 31/100% CF | 20/100% CF | 16/screen failure |
| 1/1 | 38/11% CF | — | — |

The dry peel strength for Base 1 cured with Accelerator 1 of Example 1 is included for comparison. Base 1 comprises a polythioether polymer of the invention formed using a monoepoxide and the three-step reaction process of the invention, while Base 5 comprises a polythioether polymer formed using a diepoxide. The cured composition having a polythioether polymer formed using the monoepoxide is shown to exhibit significantly greater dry peel strength (38 pli/100% CF) than the cured composition comprising a polythioether polymer formed using a diepoxide (23 pli/100% CF). The cured compositions formed using a diepoxide are unacceptable for use as aviation and aerospace sealants where it is desired that the peel strength under dry conditions, following immersion in JRF for 7 days, and following immersion in a solution of 3% NaCl according to Mil-C-27725 and Mil-A-8625 greater than 20 pli.

What is claimed is:

1. A polythioether polymer having the following segment:

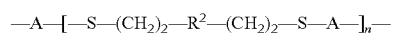  I wherein
each A is independently selected from Formulae II(a), and II(b),

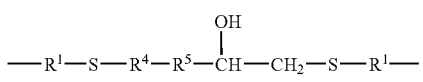  II(a)

—R¹—,  II(b)

wherein
each R¹ is independently selected from $C_{2-4}$ n-alkylene, $C_{3-6}$ branched alkylene, $C_{6-8}$ cycloalkylene, $C_{6-10}$ alkylcycloalkylene, —[—$(CH_2)_p$—X—$]_q$—$(CH_2)_r$—, and —[—$(CH_2)_p$—X—$]_q$—$(CH_2)_r$— in which at least one —$CH_2$— group may be substituted with at least one methyl group,
wherein
each X is independently selected from O, S, —NH—, and —NR³—,
R³ is selected from H, and —$CH_3$,
p is an integer from 2 to 6,
q is an integer from 1 to 5, and
r is an integer from 2 to 10,
each R⁴ is independently selected from —$CH_2$—$CH_2$—, and olefins conjugated with electron attracting groups,
each R⁵ is independently selected from $C_{2-10}$ alkylene, and $C_{2-10}$ alkyleneoxy,
each R² is independently selected from oxygen, $C_{2-6}$ alkyleneoxy, and $C_{5-12}$ cycloalkyleneoxy,
n is an integer selected to yield a molecular weight for the polythioether polymer of between 500 and 20,000 Daltons, and
the weight ratio of II(a) to II(b) is from about 2:1 to 3:1.

2. The polythioether polymer of claim 1 which has a glass transition temperature of –60° C. or less.

3. The polythioether polymer of claim 1 which is liquid at a temperature of 20° C. or less.

4. The polythioether polymer of claim 1 which is liquid at a temperature of 4° C. or less.

5. The polythioether polymer of claim 1 which is liquid at a temperature of 4° C. or less for at least one month.

6. The polythioether polymer of claim 1 wherein R¹ is derived from at least one of the following: dimercaptodioxaoctane, and dimercaptodiethylsulfide.

7. The polythioether polymer of claim 1 wherein R² comprises at least one —O—$(CH_2)_2$—O—$(CH_2)_2$—O— group.

8. The polythioether polymer of claim 1 wherein R⁴ comprises at least one —$CH_2$—$CH_2$— group.

9. The polythioether polymer of claim 1 wherein R⁵ comprises at least one —$CH_2$—O—$CH_2$— group.

10. The polythioether polymer of claim 1 wherein R⁴ comprises at least one —$CH_2$—$CH_2$— group, and R⁵ comprises at least one —$CH_2$—O—$CH_2$— group.

11. The polythioether polymer of claim 1 wherein the molecular weight is between 2,000 and 5,000 Daltons.

12. The polythioether polymer of claim 1 wherein the molecular weight is between 3,000 and 4,000 Daltons.

13. The polythioether polymer of claim 1 which is terminated with the group R⁶ wherein each R⁶ independently contains a group selected from a thiol group, a hydroxyl group, an amine group, and a vinyl group.

14. A polythioether polymer having Formula III,

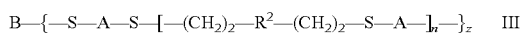  III wherein
z is an integer from 3 to 6,
B is a z-valent group,
each A is independently selected from Formulae II(a), and II(b)

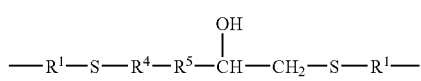  II(a)

—R¹—,  II(b)

wherein
each R¹ is independently selected from $C_{2-6}$ n-alkylene, $C_{3-6}$ branched alkylene, $C_{6-8}$ cycloalkylene, $C_{6-10}$ alkylcycloalkylene, —[—$(CH_2)_p$—X—$]_q$—$(CH_2)_r$—, and —[—$(CH_2)_p$—X—$]_q$—$(CH_2)_r$— in which at least one —$CH_2$— group may be substituted with at least one methyl group,
wherein
each X is independently selected from O, S, —NH—, and —NR³—,
R³ is selected from H, and —$CH_3$,
p is an integer from 2 to 6,
q is an integer from 1 to 5, and
r is an integer from 2 to 10,
each R⁴ is independently selected from —$CH_2$—$CH_2$—, and olefins conjugated with electron attracting groups, and
each R⁵ is independently selected from $C_{2-10}$ alkylene, and $C_{2-10}$ alkyleneoxy,
each R² is independently selected from oxygen, $C_{2-6}$ alkyleneoxy, and $C_{5-12}$ cycloalkyleneoxy,
n is an integer selected to yield a molecular weight for the polythioether polymer of between 500 and 20,000 Daltons, and
the weight ratio of II(a) to II(b) is from about 2:1 to 3:1.

15. The polythioether polymer of claim 14 which has a glass transition temperature of –60° C. or less.

16. The polythioether polymer of claim 14 which is liquid at a temperature of 20° C. or less.

17. The polythioether polymer of claim 14 which is liquid at a temperature of 4° C. or less.

18. The polythioether polymer of claim 14 which is liquid at a temperature of 4° C. or less for at least one month.

19. The polythioether polymer of claim 14 wherein z is 3.

20. The polythioether polymer of claim 14 wherein B is derived from a compound, B', that contains vinyl groups.

21. The polythioether polymer of claim 14 wherein B is derived from at least one of the following: triallylisocyanurate, and triallylcyanurate.

22. The polythioether polymer of claim 14 wherein the molecular weight is between 2,000 and 5,000 Daltons.

23. The polythioether polymer of claim 14 wherein the molecular weight is between 3,000 and 4,000 Daltons.

24. The polythioether polymer of claim 14 which is terminated with the group R⁶ wherein each R⁶ independently contains a group selected from a thiol group, a hydroxyl group, an amine group, and a vinyl group.

25. The polythioether polymer of claim 14 wherein the average functionality is between 2.05 and 3.

26. The polythioether polymer of claim 25 wherein the functionality is selected from thiol groups and vinyl groups.

27. A curable composition comprising:

30% by weight to 80% by weight of a polythioether polymer selected from a polythioether polymer of claim 1, a polythioether of claim 14, and a combination thereof, and at least one curing agent, wherein the curable composition is liquid at a temperature of 20° C. or less.

28. The curable composition of claim 27 wherein the polythioether polymer contains reactive functional groups and the curing agent contains at least two groups selected from olefins, acrylates, and polyepoxides which are co-reactive with the reactive functional groups.

29. The curable composition of claim 27 wherein the curing agent is a metal oxide.

30. The curable composition of claim 27 further comprising a filler.

31. The curable composition of claim 30 wherein the filler comprises 5% by weight to 60% by weight of the non-volatile components of the curable composition.

32. The curable composition of claim 27 that is liquid at a temperature of 4° C. or less.

33. The curable composition of claim 27 that is liquid at a temperature of 4° C. or less for at least one month.

34. The curable composition of claim 27 wherein the polythioether polymer has a glass transition temperature of −60° C. or less.

35. The curable composition of claim 27 which, when cured, has a percent volume swell not greater than 25% after immersion for one week in Jet Reference Fuel type 1 at 60° C. and atmospheric pressure.

36. The curable composition of claim 27 which is curable at a temperature less than 20° C.

37. The curable composition of claim 27 further comprising at least one plasticizer.

38. The curable composition of claim 37 wherein the at least one plasticizer comprises 1% by weight to 40% by weight of the total weight of the curable composition.

39. The curable composition of claim 37 wherein the at least one plasticizer comprises at least one of the following: a phthalate ester, a chlorinated paraffin, and a hydrogenated terphenyl.

40. The curable composition of claim 27 further comprising at least one of the following additives: pigments, cure accelerators, surfactants, adhesion promoters, thixotropic agents, and retardants.

41. The curable composition of claim 40 wherein the at least one additive comprises 0.1% to 40% by weight of the total weight of the curable composition.

42. A method of sealing an aviation or aerospace vehicle using the polythioether of claim 1, comprising the steps of:

(a) preparing a curable composition comprising the polythioether polymer, (b) cleaning a surface of an aviation or aerospace vehicle, (c) applying the curable composition to the surface of the aviation or aerospace vehicle, and (d) curing the curable composition.

43. A method of sealing an aviation or aerospace vehicle using the polythioether of claim 14; comprising the steps of:

(a) preparing a curable composition comprising the polythioether polymer, (b) cleaning a surface of an aviation or aerospace vehicle, (c) applying the curable composition to the surface of the aviation or aerospace vehicle, and (d) curing the curable composition.

44. A method of sealing an aviation or aerospace vehicle using the polythioether of claim 27, comprising the steps of:

(a) cleaning a surface of an aviation or aerospace vehicle, (b) applying the curable composition to the surface of the aviation or aerospace vehicle, and (c) curing the curable composition.

45. A process of forming a polythioether polymer comprising the steps of:

(a) reacting a polythiol with a compound comprising one epoxy group and a second group, other than an epoxy group, which is reactive with a thiol group to form a first prepolymer, wherein the polythiol preferentially reacts with the second group, (b) reacting the first prepolymer and un-reacted polythiol with the epoxy group to form a second prepolymer, and (c) reacting the second prepolymer and un-reacted polythiol with a polyvinyl ether.

46. The process of claim 45 wherein the step of reacting the first prepolymer and un-reacted polythiol with the epoxy group to form a second prepolymer takes place in the presence of a basic catalyst.

47. The process of claim 46 wherein the basic catalyst is selected from 1,8-diazabicyclo[5.4.0]undec-7-ene, 1,4-diazabicyclo[2.2.2]octane, triethylamine, pyridine, and substituted pyridine.

48. The process of claim 45 wherein the polythiol is selected from dimercaptodioxaoctane, and a combination of dimercaptodioxaoctane and dimercaptodiethylsulfide.

49. The process of claim 45 wherein the compound comprising one epoxy group and a second group, other than an epoxy group, that is reactive with a thiol group is selected from allyl glycidyl ether, glycidyl acrylate, and glycidyl methacrylate.

50. The process of claim 45 wherein the polyvinyl ether comprises a divinyl ether.

51. The process of claim 50 wherein the divinyl ether comprises at least one of the following: diethylene glycol divinyl ether, allyl acrylate, allyl methacrylate, and vinylcyclohexene.

52. The process of claim 45 wherein step (c) takes place in the presence of a free-radical catalyst.

53. A process of forming a polythioether polymer comprising the steps of:

(a) reacting a polythiol with a compound comprising one epoxy group and a second group, other than an epoxy group, which is reactive with a thiol group to form a first prepolymer, wherein the polythiol preferentially reacts with the second group, (b) reacting the first prepolymer and un-reacted polythiol with the epoxy group to form a second prepolymer, and (c) reacting the second prepolymer and un-reacted polythiol with a polyvinyl ether and a polyfunctionalizing agent.

54. The process of claim 53 wherein the step of reacting the first prepolymer and un-reacted polythiol to form the second prepolymer takes place in the presence of a basic catalyst.

55. The process of claim 54 wherein the basic catalyst is selected from 1,8-diazabicyclo[5.4.0]undec-7-ene, 1,4-diazabicyclo[2.2.2]octane, triethylamine, pyridine, and substituted pyridine.

56. The process of claim 53 wherein the polythiol is selected from dimercaptodioxaoctane, and a combination of dimercaptodioxaoctane and dimercaptodiethylsulfide.

57. The process of claim 53 wherein the compound comprising one epoxy group and a second group, other than an epoxy group, that is reactive with a thiol group is selected from allyl glycidyl ether, glycidyl acrylate, and glycidyl methacrylate.

58. The process of claim 53 wherein the polyvinyl ether comprises a divinyl ether.

59. The process of claim 58 wherein the divinyl ether comprises at least one of the following: diethylene glycol divinyl ether, allyl acrylate, allyl methacrylate, and vinylcyclohexene.

60. The process of claim 53 wherein the polyfunctionalizing agent is trifunctional.

61. The process of claim 53 wherein the polyfunctionalizing agent comprises at least triallylcyanurate.

62. The process of claim 53 wherein the polythioether polymer has a glass transition temperature of −60° C. or less.

63. The process of claim 53 wherein the polythioether polymer is liquid at a temperature of 20° C. or less.

64. The process of claim 53 wherein the polythioether polymer is liquid at a temperature of 4° C. or less.

65. The process of claim 53 wherein the polythioether polymer is liquid at a temperature of 4° C. or less for at least one month.

66. The process of claim 53 wherein step (c) takes place in the presence of a free-radical catalyst.

67. A polythioether polymer formed by:
  (a) reacting a polythiol with a compound comprising one epoxy group and a second group, other than an epoxy group, which is reactive with a thiol group to form a first prepolymer, wherein the polythiol preferentially reacts with the second group,
  (b) reacting the first prepolymer and un-reacted polythiol with the epoxy group to form a second prepolymer, and
  (c) reacting the second prepolymer and un-reacted polythiol with a polyvinyl ether.

68. The polythioether polymer of claim 67 formed by further reacting the second prepolymer, un-reacted polythiol, and polyvinyl ether in step (c) with a polyfunctionalizing agent.

69. The polythioether polymer of claim 68 wherein the polyfunctionalizing agent is trifunctional.

70. The polythioether polymer of claim 68 wherein the polyfunctionalizing agent comprises at least triallylcyanurate.

71. The polythioether polymer of claim 67 in which step (c) is conducted in the presence of a free-radical catalyst.

72. The polythioether polymer of claim 67 in which step (b) is conducted in the presence of a basic catalyst.

73. The polythioether polymer of claim 72 wherein the basic catalyst is selected from 1,8-diazabicyclo[5.4.0]undec-7-ene, 1,4-diazabicyclo[2.2.2]octane, triethylamine, pyridine, and substituted pyridine.

74. The polythioether polymer of claim 67 wherein the polythiol is selected from dimercaptodioxaoctane, and a combination of dimercaptodioxaoctane and dimercaptodiethylsulfide.

75. The polythioether polymer of claim 67 wherein the compound comprising one epoxy group and a second group, other than an epoxy group, that is reactive with a thiol group is selected from allyl glycidyl ether, glycidyl acrylate, and glycidyl methacrylate.

76. The polythioether polymer of claim 67 wherein the polyvinyl ether comprises a divinyl ether.

77. The polythioether polymer of claim 76 wherein the divinyl ether comprises at least one of the following: diethylene glycol divinyl ether, allyl acrylate, allyl methacrylate, and vinylcyclohexene.

78. The polythioether polymer of claim 67 which has a glass transition temperature of −60° C. or less.

79. The polythioether polymer of claim 67 which is liquid at a temperature of 20° C. or less.

80. The polythioether polymer of claim 67 which is liquid at a temperature of 4° C. or less.

81. The polythioether polymer of claim 67 which is liquid at a temperature of 4° C. or less for at least one month.

* * * * *

UNITED STATES PATENT AND TRADEMARK OFFICE
CERTIFICATE OF CORRECTION

| | |
|---|---|
| PATENT NO. | : 7,097,883 B2 |
| APPLICATION NO. | : 10/456138 |
| DATED | : August 29, 2006 |
| INVENTOR(S) | : Suresh Sawant, Chandra Bhushan Rao and David Rosendo Leon |

It is certified that error appears in the above-identified patent and that said Letters Patent is hereby corrected as shown below:

Column 21, line 14, "$C_{2-4}$" should read --$C_{2-6}$--.

Signed and Sealed this

Sixth Day of January, 2009

JON W. DUDAS
*Director of the United States Patent and Trademark Office*